Sept. 4, 1934.  W. H. RADFORD  1,972,393
SHAFT SEAL
Original Filed April 30, 1928
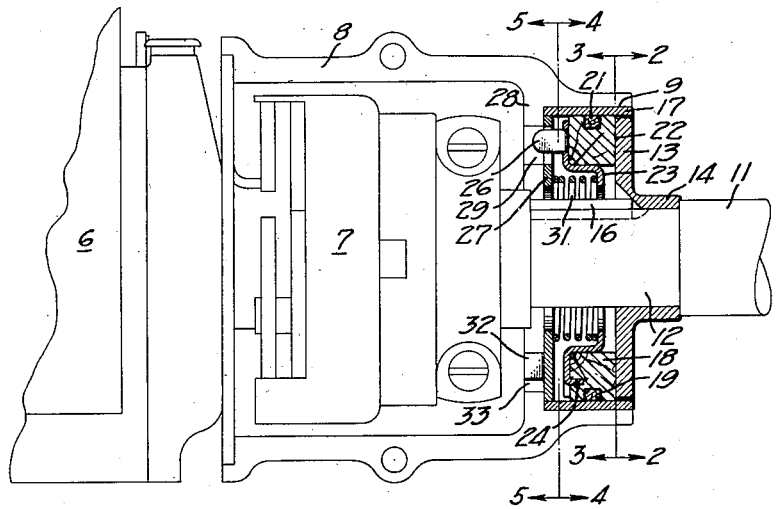
FIG_1_
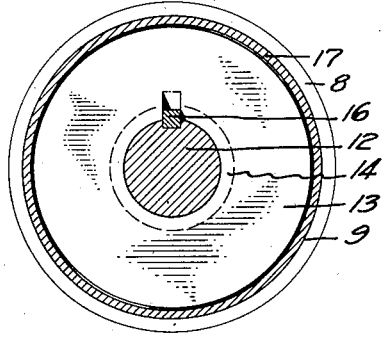
FIG_2_
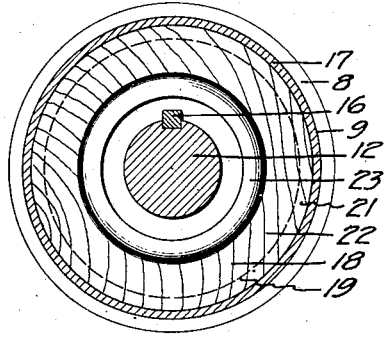
FIG_3_
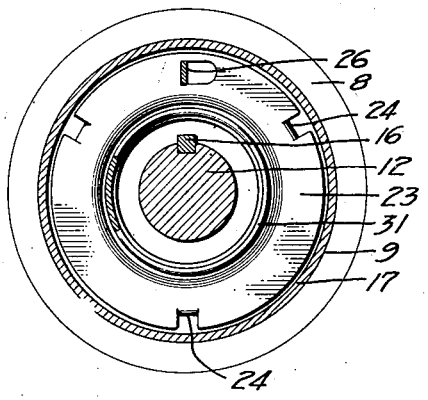
FIG_4_
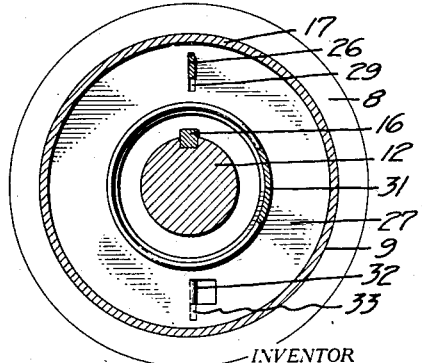
FIG_5_
INVENTOR
William H. Radford
BY
ATTORNEYS Patented Sept. 4, 1934

1,972,393

UNITED STATES PATENT OFFICE 1,972,393

SHAFT SEAL

William H. Radford, Peoria, Ill., assignor to Caterpillar Tractor Co., San Leandro, Calif., a corporation of California Application April 30, 1928, Serial No. 273,810
Renewed November 21, 1932

16 Claims. (Cl. 286—7)

My invention relates to devices for preventing communication between the interior and exterior of a housing surrounding a protruding shaft. There are numerous applications for such devices under widely varying conditions. One housing may hold lubricant which must be effectively retained. Another housing may be dry and afford no lubricant for a shaft seal. Practically all housings should be inaccessible to outside matter. The entrance of the drive shaft to the magneto casing on a tractor presents a representative environment for a shaft seal. The conditions are adverse. There are almost always quantities of dust and dirt attending the operation of the tractor. They must be kept from the delicate interior parts of the magneto. The casing customarily contains no lubricant and the shaft seal is thus without external lubrication but nevertheless has to operate for protracted periods with undiminished effectiveness. One object of my invention, therefore, is to provide a shaft seal which can operate without external lubrication.

An additional object of my invention is to provide a shaft seal which will substantially prevent communication between opposite sides of a housing surrounding a shaft.

Another object of my invention is to provide a shaft seal which is easily assembled and constructed.

The foregoing and other objects are attained in the embodiment of the invention shown in the drawing, in which Fig. 1 is a cross section thru a typical embodiment of my invention, the plane of section being taken vertically thru the shaft axis and various parts being shown in side elevation.

Fig. 2 is a cross section on the line 2—2 of Fig. 1.

Fig. 3 is a cross section, the plane of which is indicated by the line 3—3 of Fig. 1.

Fig. 4 is a cross section on the line 4—4 of Fig. 1.

Fig. 5 is a cross section on the plane 5—5 of Fig. 1.

In its preferred form, my invention usually comprises a casing having a cylindrical aperture therein thru which passes a shaft carrying a disc. A collar bearing peripherally within the casing is resiliently urged against the disc.

As disclosed in the drawing, the present modification of my invention is used with a magneto 6 provided with an impulse starter 7 enclosed in a casing 8. This casing is substantially dust tight except for a cylindrical aperture 9 thru which the magneto drive shaft 11 projects. I preferably reduce the shaft 11 in diameter, as at 12, and slip over the reduced portion a disc or annular plate 13 having a mounting hub 14 secured to the shaft by a key 16 for unitary rotation therewith. The disc 13 extends radially within a short distance of a cylindrical bushing 17 pressed or otherwise fixed within the cylindrical portion 9 of the casing.

Fitting rather tightly within the bushing 17 is a collar 18 which serves as a seal packing and is usually of annular form and of material which is self-lubricating. In the present instance, the annulus is of wood impregnated with a suitable oil. On its periphery the collar is provided with a groove 19 filled with a treated packing material 21 which projects sufficiently to wipe the surface 17 as the collar moves axially with respect thereto. To maintain a face 22 of the collar in contact with the disc 13, I have provided a metal ring or washer 23 of annular form having an offset hub, and which serves as a backing plate for the packing ring 18. The hub extends within the aperture of the annular collar and loosely surrounds the reduced portion 12 of the shaft.

To secure the washer 23 and the collar 18 for unitary movement, the washer is provided with a number of peripheral prongs 24 which are downturned and forced into the material of the annulus 18. Also projecting from the washer 23 is a tongue 26 struck from the material of the washer and passing thru an apertured plate 27, loosely mounted within the casing and situated against a shoulder 28 forming part of the casing 8. The tongue 26 engages the walls of a slot 29 in the casing and the washer is thus free to move axially but is constrained against rotation relative to the casing. The constrainment is likewise effective on the annular collar 18 so that it can move axially within the bushing 17 but cannot rotate with the disc 13.

To maintain the collar 18 in extreme axial position and in yielding contact with the disc 13, there is provided a coil spring 31 confined within the casing and abutting the washer 23. A seat for the spring is afforded by the plate 27, positioned by a lug 32 entering a notch 33 cut in the casing. The expansive force of spring 31 urges the collar 18 into close frictional contact with the revolving disc 13. The contact between the two elements rotating relative to each other is so close that communication past the shaft seal is practically impossible. The packing 21 in the collar is also sufficiently tight to preclude the passage of material into and out of the casing and, since the axial movement of the collar 18 is very minute, is subject to very light duty. Due to the material of certain of the parts, the seal is self-lubricating. It can be used however, with or without modification, if external lubrication is available.

It is to be understood that I do not limit myself to the form of shaft seal shown and described herein, as the invention, as set forth in the following claims may be embodied in a plurality of forms.

I claim:

1. A shaft seal comprising a casing having a cylindrical aperture therein, a shaft extending through said aperture, a disc on said shaft adjacent said casing, a collar peripherally in contact with said casing and abutting said disc, a washer secured to said collar, an apertured plate situated against a shoulder of said casing, a tongue struck from the material of said washer extending through the aperture of said plate and engaging said casing for constraining said washer against rotation in said casing, and a spring confined between said washer and said plate for urging said collar against said disc.

2. A seal between a shaft and a casing, comprising an annular, oil-soaked block of wood, a cupped washer secured in said block, a disc keyed to said shaft, and a spring bearing against said casing and seated in said washer to maintain said block in contact with said disc.

3. A seal for a shaft in a casing, comprising a disc keyed to said shaft, a bushing in said casing, an annular, oil-soaked block of wood, having a strip of packing in contact with said bushing, a cupped washer having offset portions embedded in said block and a lug, a plate within said bushing having an aperture for said lug, said casing having an aperture for said lug, and a spring bearing against said plate and seated in said washer to maintain said block in contact with said disc.

4. A seal for a shaft projecting through an aperture in a casing, comprising an element on said shaft, a two part device slidable in said aperture and having spring means to urge said parts apart, one of said parts abutting said casing along a surface transverse to said shaft, and cooperating guides on said parts and said casing to limit movement of said parts to sliding movement.

5. A seal for a shaft passing through an aperture in a casing, comprising a member mounted on said casing having an inner cylindrical surface concentric with said aperture, an annular disc mounted on said shaft for rotation therewith, an element facing said disc and encompassing said shaft within said member, the back of said element being spaced from said casing, and being substantially Z-shaped in profile, the surfaces of said back adjacent said shaft and said member being in parallel planes normal to the axis of said shaft, the remaining surface of said back being cylindrical and concentric with said shaft, and spring means interposed between said casing and said element and bearing against the surface of the back of said element adjacent said shaft, an annular sealing member between said element and said member, and means to connect said sealing member to said element at the portion of said element adjacent said member.

6. A seal between a casing and a rotatable member projecting through an open end of the casing, said casing having a shoulder portion spaced inwardly from said open end, comprising an annular plate member rotatable with the rotatable member and positioned adjacent the open end of the casing, an annular sealing collar adapted to be maintained in frictional contact with the annular plate member, a backing plate secured to the sealing collar, a second plate spaced from the backing plate and adapted to abut said shoulder, means contacting the second plate and the casing to constrain the second plate to axial movement only, a member projecting from the backing plate and engaging the second plate to hold the backing plate and the sealing collar against rotation, and spring means interposed between the second plate and the backing plate to thrust the second plate against the shoulder and to thrust the sealing collar against the annular plate member.

7. A seal between a casing and a rotatable member projecting through an open end of the casing, said casing having a shoulder portion spaced inwardly from said open end, comprising an annular plate member rotatable with the rotatable member and positioned adjacent the open end of the casing, an annular sealing collar adapted to be maintained in frictional contact with the annular plate member, a backing plate secured to the sealing collar, a second plate spaced from the backing plate and adapted to abut said shoulder, said second plate being loosely mounted within the casing, means contacting the second plate and the casing to constrain the second plate to axial movement only, a member projecting from the backing plate and engaging the second plate to hold the backing plate and the sealing collar against rotation, and spring means interposed between the second plate and the backing plate to thrust the second plate against the shoulder and to thrust the sealing collar against the annular plate member.

8. A seal between a casing and a rotatable member projecting through an open end of the casing, said casing having a shoulder portion spaced inwardly from said open end, comprising an annular plate member rotatable with the rotatable member and positioned adjacent the open end of the casing, an annular sealing collar adapted to be maintained in frictional contact with the annular plate member, a backing plate secured to the sealing collar, a second plate spaced from the backing plate and adapted to abut said shoulder, said second plate being loosely mounted within the casing, a member projecting from the second plate and engaging the casing to constrain the second plate to axial movement only, a member projecting from the backing plate and engaging the second plate to hold the backing plate and the sealing collar against rotation, and spring means interposed between the second plate and the backing plate to thrust the second plate against the shoulder and to thrust the sealing collar against the annular plate member.

9. A seal structure between stationary means and rotatable means forming an annular space therebetween, comprising a two part device each part loosely mounted and slidable in said space, means interposed between said parts to thrust one against the stationary means and the other against the rotatable means, and means cooperating with said parts to limit movement of both said parts to sliding movement.

10. A seal structure between stationary means and rotatable means forming an annular space therebetween, comprising a sealing surface rotatable with said rotatable means, a packing adapted to be maintained in sealing contact with said surface, a backing plate therefor and loosely mounted within said space, a second plate loosely mounted within said space and adapted to abut said stationary means, means interposed between said plates to thrust them apart, and means cooperating with said plates to limit movement thereof to sliding movement.

11. A seal structure between stationary means and rotatable means forming an annular space therebetween, comprising a sealing surface rotatable with said rotatable means, a packing adapted to be maintained in sealing contact with said surface, a backing plate therefor and loosely mounted within said space, a second plate loosely mounted within said space and adapted to abut said stationary means, means interposed between said plates to thrust them apart, means interconnecting said plates to prevent relative rotary movement therebetween, and means cooperating with said stationary means and one of said plates to limit movement of said plates to sliding movement.

12. A seal structure between stationary means and rotatable means forming an annular space therebetween, comprising a sealing surface rotatable with said rotatable means, a packing adapted to be maintained in sealing contact with said surface, a backing member therefor and loosely mounted within said space, a second member loosely mounted within said space and adapted to abut said stationary means, means interposed between said members to thrust them apart, a key on one of said members adapted to engage in the other of said members to prevent relative rotary movement therebetween, and means cooperating with said stationary means and one of said members to limit movement of said members to sliding movement.

13. A seal structure between stationary means and rotatable means forming an annular space therebetween, comprising a sealing surface rotatable with said rotatable means, a packing member having a sealing surface adapted to be maintained in sealing contact with said rotatable sealing surface, a backing plate for said packing member and loosely mounted within said space, a second plate loosely mounted within said space and having a surface adapted to abut said stationary means, the planes of all said mentioned surfaces being parallel and transverse to the axis of rotation of said rotatable means, means interposed between said plates to thrust them apart, and means cooperating with said plates to limit movement thereof to sliding movement.

14. A sealing structure adapted to be inserted in an annular space formed between rotatable and stationary means, said structure being adapted to fit freely and loosely in said space and comprising, a packing member adapted to be maintained in sealing contact with a surface rotatable with said rotatable means, a backing plate therefor, a second plate adapted to be maintained in spaced relationship with respect to said backing plate and adapted to abut said stationary means, resilient means for holding said plates apart, a connection between said plates to prevent relative rotary movement therebetween and to allow relative sliding movement therebetween, and means provided on one of said plates for forming a connection with said stationary means to hold both of said plates against rotation.

15. A sealing structure adapted to be inserted in an annular space formed between rotatable and stationary means, said structure being adapted to fit freely and loosely in said space and comprising, a packing member adapted to be maintained in sealing contact with a surface rotatable with said rotatable means, a backing plate therefor, a second plate adapted to be maintained in spaced relationship with respect to said backing plate and adapted to abut said stationary means, resilient means for holding said plates apart, a key on one of said plates adapted to engage in an opening in the other of said plates to prevent relative rotary movement therebetween and to allow relative sliding movement therebetween, and means provided on one of said plates for forming a connection with said stationary means to hold both of said plates against rotation.

16. A seal between a casing and a rotatable member projecting through an open end of the casing, comprising an annular plate member rotatable with the rotatable member and positioned adjacent the open end of the casing, an annular sealing collar adapted to be maintained in frictional contact with the annular plate member, a backing plate for the sealing collar and loosely mounted within the casing, a loosely mounted second plate spaced from the backing plate and adapted to abut said casing along a surface transverse to the rotational axis of said rotatable member, means contacting the second plate and the casing to constrain the second plate to axial movement only, a member projecting from the backing plate and engaging the second plate to hold the backing plate against rotation, and spring means interposed between the second plate and the backing plate to thrust the second plate against the casing and to thrust the sealing collar against the annular plate member.

WILLIAM H. RADFORD.